March 10, 1925.
V. LINK
1,529,074
AUTOMOBILE CHASSIS CONSTRUCTION
Filed April 3, 1924  2 Sheets-Sheet 1
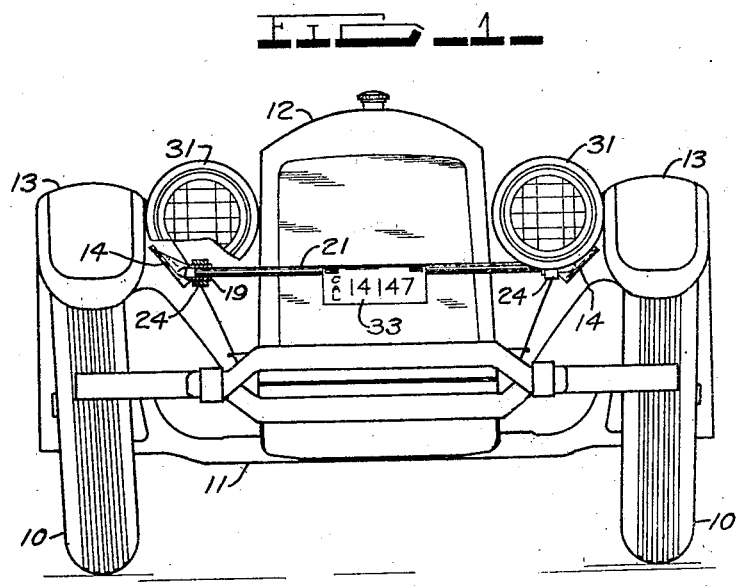
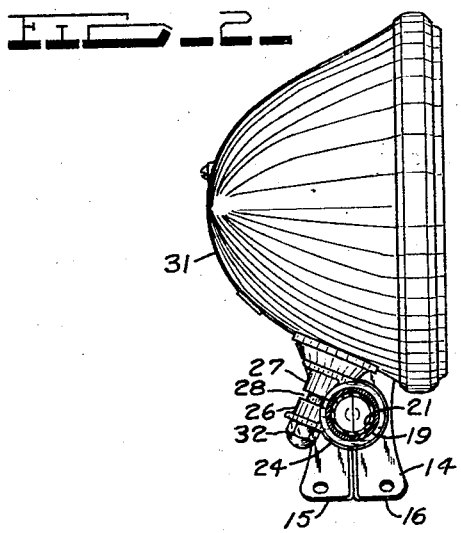
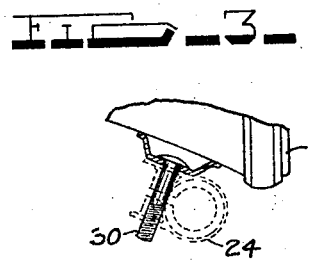
INVENTOR
VINCENT LINK
BY
*P. N. Pomeroy*
ATTORNEY March 10, 1925. 1,529,074
V. LINK
AUTOMOBILE CHASSIS CONSTRUCTION
Filed April 3, 1924 2 Sheets-Sheet 2
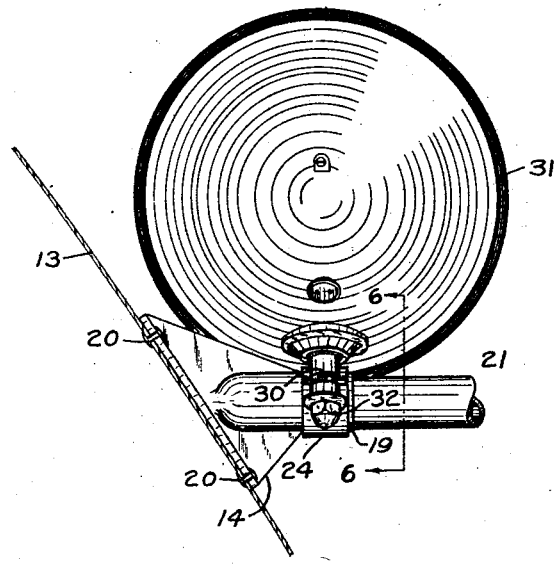
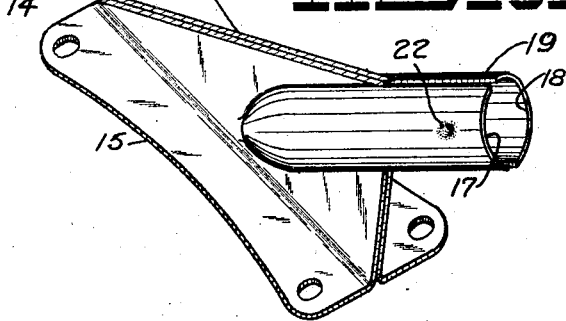
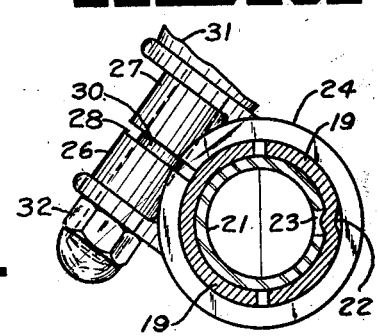
INVENTOR
VINCENT LINK
BY
ATTORNEY

Patented Mar. 10, 1925.

1,529,074

UNITED STATES PATENT OFFICE.

VINCENT LINK, OF DETROIT, MICHIGAN, ASSIGNOR TO THE STUDEBAKER CORPORATION, OF SOUTH BEND, INDIANA, A CORPORATION OF NEW JERSEY.

AUTOMOBILE CHASSIS CONSTRUCTION.

Application filed April 3, 1924. Serial No. 704,065.

*To all whom it may concern:*

Be it known that I, VINCENT LINK, a citizen of the United States of America, and resident of Detroit, in the county of Wayne and State of Michigan, have invented certain new and useful Improvements in Automobile Chassis Constructions, of which the following is a specification.

This invention relates to motor vehicles and particularly to lamp supports and fender braces for the same, and one of the objects is to provide a single means for adjustably mounting a headlamp in place and for fastening a fender brace to a fender.

Another object is to provide means for adjustably mounting a headlamp upon a motor vehicle which will allow the light rays from the lamp to be directed in any direction.

Another object is to provide a clamp for adjustably mounting a headlamp upon a motor vehicle which will allow the light rays from the lamp to be directed in any direction, and in which adjusted position the lamp may be secured by means of tightening up a single screw means.

Still another object is to provide a bracket upon a fender for telescopically receiving a fender brace and also forming a headlamp support.

A further object is to provide a bracket upon a fender for telescopically receiving a fender brace and also forming a support for a headlamp, and means for adjustably positioning and securing the headlamp thereon and securing the fender brace thereto by a single screw means.

A still further object is to provide upon a fender a bracket having a split tubular end adapted to telescopically receive a fender brace therein, and adapted to receive thereon a clamping member having an opening adapted to receive the split tubular end on the bracket and having a split boss projecting therefrom provided with an opening at right angles to the first mentioned opening, adapted to receive a stud projecting from a headlamp, and a nut threaded on the stud for drawing said headlamp down upon said clamping member and drawing said clamping member and said split tubular end about said fender brace, whereby all of said members will be rigidly secured together.

These being among the objects of the present invention, the same consists of certain combinations of parts and features of construction to be hereinafter described with reference to the accompanying drawings, which illustrate one suitable embodiment of the present invention, and then claimed, having the above and other objects in view.

In the accompanying drawings like numerals refer to like parts throughout the several views; in which, Figure 1 is a fragmentary, partially broken view of the front of an automobile in which my present invention is incorporated.

Figure 2 is a side view of one of the headlamps and co-operating parts of the automobile of Figure 1, showing the relation of the different parts involved in the present invention.

Figure 3 is a fragmentary view of one of the headlamps showing the manner in which the fastening stud is secured thereto, and showing in dotted lines, the relative position of the clamping member thereto.

Figure 4 is a fragmentary view from the rear of one of the headlamps showing the relation of certain parts relative thereto.

Figure 5 is a perspective view of one of the brackets which are secured to the fenders and which receive the fender brace and upon which is adapted to be mounted the clamping member.

Figure 6 is an enlarged fragmentary view taken on the line 6—6 of Figure 4.

Figure 7 is a perspective view of the clamping member.

The automobile shown in Figure 1 is of the conventional type having road wheels 10, front axle 11, radiator 12 and fenders 13. Upon the inner side of each fender 13 is mounted a bracket 14, a preferable form of which is shown in Figure 5. As shown it is composed of two metal stampings 15 and 16 having flanged bases which are adapted to conform in shape to fit the sides of the fenders 13 and which are also provided with elongated raised portions 17 and 18. The two parts 15 and 16 are spot welded or otherwise secured together in the position shown, the planes of the flanged bases substantially coinciding and the two raised portions 17 and 18 matching and forming the split tubular projection 19. The brackets 14 are suitably secured in position on the inside faces of the fenders 13 by rivets 20 as shown in Figure 4 or by any other suitable means such as spot welding, bolts, etc., and are so positioned that the axis of the split tubular portion 19 is horizontal, and perpendicular to the longitudinal center line of the automobile when secured in place.

A fender brace such as 21, having tubular ends adapted to be received in the split tubular portions 19, has one end inserted in the split tubular portion 19 of one of the brackets 14 and its other end inserted in the corresponding split tubular portion 19 of the other bracket 14 secured to the opposite fender, and is secured therein by means which will presently be described. It will thus be seen that by clamping the brace 21 to the brackets 14 that the fenders are locked together in a lateral direction which helps to prevent lateral movement of one in relation to the other and also prevents movement of the fenders in relation to the frame of the automobile.

It is sometimes preferable to provide means for locating the brace rod 21 in a particular angular position, such as is necessary when it is provided with openings for securing the license plate 33 thereto, and also for locating the proper lateral position of one fender relative to the other. Such means are provided in the construction shown by forming a slight depresison 22 in the outside of the tubular end portion 19 which in turn forms a corresponding projection on its interior surface. By forming a hole 23 in each end of the brace rod 21 at predetermined distances and in predetermined angular relation with other points such as the openings for fastening the license plate thereto as before mentioned, so that when the brace rod 21 is inserted into the split tubular portion 19, the rod 21 may be manipulated until the projection on the interior of the tubular portion 19, formed by the depression 22 in its outer surface, drops into the hole 23 in the end of the rod 21 as shown in Figure 6 and thus locates it in its proper position.

Around the outside of the tubular split portion 19 is provided a clamping member 24, which is provided with an opening 25 adapted to receive the split tubular portion 19 of the bracket 14 and is further provided with two extending ears or projections 26 and 27 which are separated by a slot 28 which extends into and is parallel to the axis of the opening 25. An opening 29 is provided in the ears 26 and 27 perpendicular to the axis of the opening 25, and is adapted to receive the stud 30 secured to the headlamp 31 as shown in Figure 3. The stud 30 projects through the ears 26 and 27 and receives a nut 32 on its projecting end. It is readily apparent that when the nut 32 is drawn up on the stud 30 the lamp 31 is drawn down on the ear 27, the ears 26 and 27 are drawn together diminishing the width of the slot 28 and drawing the clamping member 24 around the split tubular portion 19 of the bracket 14 and, in turn, drawing the split tubular portion 19 around the end of the brace rod 21, thus securing the end of the brace rod 21, thus securing the headlamp from movement in any direction relative to the bracket 14 and holding the brace rod 21 securely in the bracket 14. Thus the headlamp 31 and brace rod 21 are locked to the bracket 14 by a single nut 32, the advantages of which are readily apparent.

It will be noted that when the nut 32 is loosened, the headlamp 31 may be turned about the axis of the stud 30 in any direction, and, further, it may be turned about the axis of the split tubular portion 19 of the bracket 14 in any direction, by reason of the clamping member 24 turning thereon, giving, in fact, a universally adjustable movement to the lamp 31 which allows its light rays to be projected in any direction desired.

While only one embodiment of the present invention is shown in the accompanying drawings, it is apparent that formal changes may be made in the specific embodiment described without departing from spirit and substance of the broad invention, the scope of which is commensurate with the appended claims.

What I claim is:—

1. The combination with an automobile fender, a headlamp and a fender brace rod, of a bracket secured to said fender provided with an opening for receiving said brace rod, a clamping member surrounding a portion of said bracket, and a single screw means co-operating with said clamping member for adjustably securing said head lamp, brace rod and bracket together.

2. The combination with a lamp, a fender and a fender brace, of a bracket secured to said fender having a tubular projecting portion receiving said brace, a contractible clamping member surrounding said projecting portion and said brace and provided with an opening perpendicular to the center line of said brace, a stud on said lamp projecting through said opening and a nut on said stud to clamp said members in operative position.

3. In an automobile, the combination with a fender and a brace rod therefore, of a bracket secured to said fender having a tubular portion adapted to receive an end of said brace rod, a clamping member surrounding said tubular portion and said end, a lamp having a projecting stud thereon received by said clamping member, and a nut engaging said stud for securing said brace rod, bracket and clamping member together.

4. The combination with an automobile having two oppositely disposed fenders, of a bracket on each of said fenders having a tubular extending portion, a brace rod extending between said fenders, the ends of which are receivered in said brackets, a lamp, a split clamping member surrounding the tubular extending portion of said brackets and provided with an opening for receiving a stud projecting from said lamp, and a nut on said stud for drawing said lamp down on said clamping member and said tubular extending portion about said brace end.

5. The combination of a lamp, a fender and a fender brace, of a bracket secured to said fender provided with a split tubular portion receiving an end of said brace therein; a split clamping member provided with an opening receiving said split tubular end and provided with projecting portions on either side of said slot, said projecting portions being provided with an opening perpendicular to the axis of the first mentioned openings; a clamp; a stud on said lamp projecting through the second mentioned opening; and single means for locking said lamp to said clamping member, said clamping member to said bracket, and said bracket to said brace.

6. The combination with an automobile fender, a headlamp and a fender brace rod, of a bracket secured to said fender composed of two metal stampings having flanged base parts and extending raised portions, said flanged base parts forming a continuous base when said stampings are secured together in operative relation and said extending raised portions forming a split tubular extension adapted to receive an end of said fender brace rod; a clamping member surrounding said tubular extension having an offset portion provided with an opening perpendicular to the axis of said brace rod; a stud on said headlamp projecting through said opening; and a nut on said stud for securing said lamp, clamping member, bracket and brace rod together.

7. The combination with an automobile fender, a headlamp and a fender brace rod, of a bracket secured to said fender provided with an opening for receiving said brace rod, means on said bracket and co-operating means on said brace rod for locating the latter in correct axial and angular relation to the former, a clamping member surrounding a portion of said bracket and a single screw means for securing said head lamp, brace rod and bracket together.

8. The combination with a lamp having a stud projecting therefrom, a fender, and a fender brace having a license plate receiving portion and a license plate, of a bracket secured to said fender having a split tubular projecting portion provided with an internal projection, an opening in said brace rod at a predetermined angular and axial position relative to said license plate receiving portion to receive said internal projection, a contractible clamping member provided with an opening to receive said split tubular projecting portion and a second opening perpendicular thereto for receiving said stud, and a nut engaging said stud for locking said lamp, brace rod, clamping member and bracket together.

Signed by me at Detroit, Michigan, U. S. A. this 27th day of March, 1924.

VINCENT LINK.

Witnesses:
 DONAL B. WAITE,
 HODGSON S. PIERCE.